United States Patent [19]

Ozeki

[11] Patent Number: 4,906,091
[45] Date of Patent: Mar. 6, 1990

[54] GLASS STAGE AND AN OVERHEAD TYPE PROJECTOR SYSTEM

[75] Inventor: Jiro Ozeki, Tokyo, Japan

[73] Assignee: Slidex Corporation, Tokyo, Japan

[21] Appl. No.: 237,077

[22] Filed: Aug. 29, 1988

[30] Foreign Application Priority Data

Sep. 2, 1987 [JP] Japan .................................. 62-217979
Sep. 2, 1987 [JP] Japan .................................. 62-217980

[51] Int. Cl.⁴ ............................................. G03B 23/08
[52] U.S. Cl. ............................... 353/23; 353/DIG. 5; 353/79; 353/27 R
[58] Field of Search .................. 353/DIG. 5, DIG. 3, 353/22–24, 25, 95, 74–79

[56] References Cited

U.S. PATENT DOCUMENTS

| | | | |
|---|---|---|---|
| 3,424,524 | 1/1969 | Akiyama et al. | 353/22 |
| 3,836,242 | 9/1974 | Kluver et al. | 353/27 R |
| 4,198,137 | 4/1980 | Stites | 353/23 |
| 4,704,019 | 11/1987 | Yamamoto | 353/25 R X |

Primary Examiner—Harry N. Haroian
Attorney, Agent, or Firm—Fleit, Jacobson, Cohn, Price, Holman & Stern

[57] ABSTRACT

A glass stage for use as an upper stage in an overhead type projector system. The glass stage includes a rectangular frame body having substantially the same dimension as that of a lower stage of a projector, a lower transparent plate fixed to the rectangular frame body, and an upper transparent plate which pushes a strip film onto the lower transparent plate. The upper plate is rotatably supported by brackets provided on the frame body. Each of the brackets is provided with a longitudinal hole which engages with hinge pins for guiding movement of the upper transparent plate in a drawing direction thereof. The longitudinal hole is provided with a portion inclined downwardly at an end of a pushing side of the upper transparent plate. The rectangular frame body is provided at one side portion thereof with small holes through which the upper stage-fitting pins are to be snugly fitted.

15 Claims, 9 Drawing Sheets

FIG_6

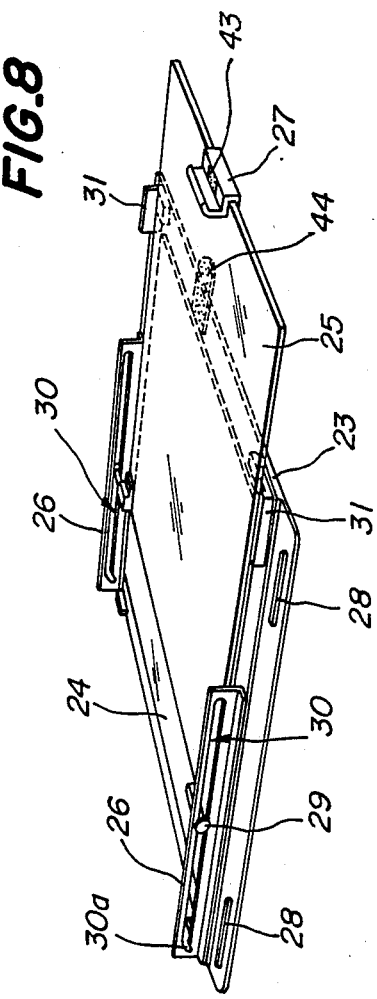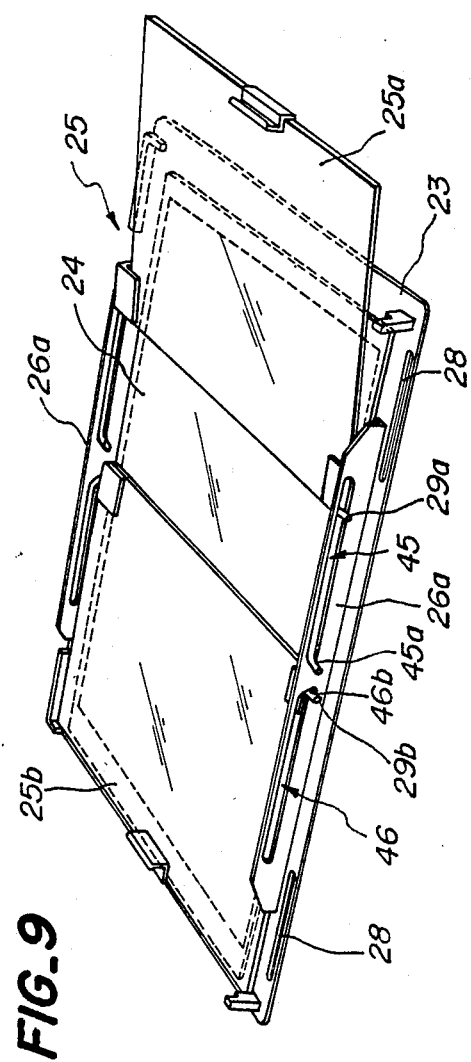

FIG.10 _PRIOR ART_
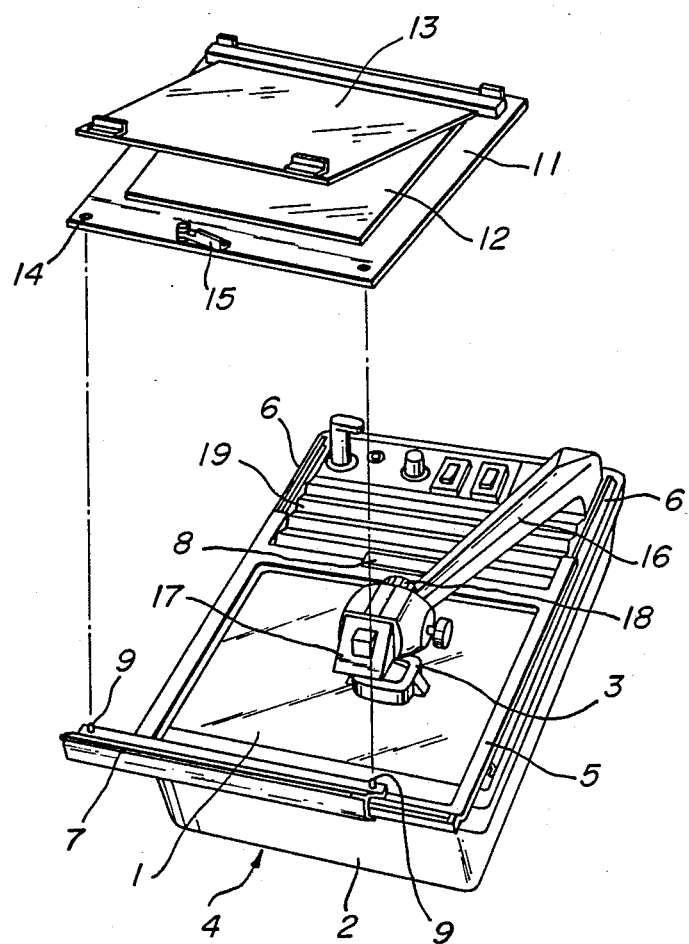

GLASS STAGE AND AN OVERHEAD TYPE PROJECTOR SYSTEM

BACKGROUND OF THE INVENTION (1) Field of the Invention

The present invention relates to glass stages which are to be used as upper stages for overhead type projectors and which each comprise upper and lower transparent plates between which ordinary length or long strip films are to be held directly or indirectly through a film jacket. More particularly, the present invention relates to glass stages for allowing free opening of the upper transparent plate thereof without interference between a reflecting mirror and a projecting lens system attached to a supporting arm of the projector in the state that the glass stage is fitted into the projector. Further, the invention relates to glass stages for allowing smooth projection of all images in a strip film having a length greater than a lateral size of a projector body onto a screen without needing changing of the film relative to the glass stage. Furthermore, the present invention relates to overhead type projector systems possessing such glass stages.

(2) Related Art Statement

In FIG. 10 is shown by way of example a conventionally known glass stage to be used as an upper stage in an overhead type projector.

In the overhead type projector of FIG. 10, a light source unit not shown is housed inside a box body closed with a translucent plate 1 at an upper opening thereof, and an upper end of a condenser lens 3 penetrates upwardly through the translucent plate 1, thereby constituting a projector body 4. A lower stage is supported slidably to-and-fro above the projector body 4 by guide rails 6 provided at right and left sides of the projector body 4. The lower stage 5 is formed by a rectangular frame body having a slightly smaller longitudinal dimension than that of the translucent plate 1. An upper stage-fitting member 7 is supported on a front side portion of the lower stage 5 such that the fitting member 7 may be laterally slidable in an extending direction of the front side portion of the lower stage, that is, it may reciprocally move in the lateral direction of the projector body 4. An upper stage-guiding member 8 is provided at a rear side of the lower stage 5, and a pair of two upper stage-fitting pins 9 upwardly project from the upper stage-fitting member 7.

The above conventionally known glass stage is applied to such an overhead type projector. In the glass stage, a lower transparent plate 12 made of glass or plastic is fixed to a central portion of a rectangular frame body 11 having substantially the same outer periphery of the flat lower stage 5, and an upper transparent plate 13 is hinged to a rear side portion of the rectangular frame body 11 so that it may freely be opened or closed. This upper plate 13 pushes a strip film onto the lower transparent plate 12. Further, two small holes 14 are formed at the front side portion of the rectangular frame body 11 to snugly fit with a pair of the above-mentioned upper stage-fitting pins 9, respectively.

In this glass stage, a reference numeral 15 denotes a lock pin which is turned onto the upper transparent plate to prevent accidental opening thereof.

In the illustrated overhead type projector, reference numerals 16, 17 and 18 denote a supporting arm extending above the translucent plate from one corner of the projector body 4, a reflecting mirror attached to a tip end of the supporting arm 16 just above the condenser lens 3, and a projecting lens system also attached to the tip end of the supporting arm 16, respectively. A reference numeral 19 is a lightinterrupting membrane extended above the translucent plate between the rear side portion of the lower stage 5 and the projector body 4.

The two small holes 14 formed at the front side portion of the glass stage are fitted to the respective upper stage-fitting pins 9 projecting from the upper stage-fitting member 7, and the rear side portion of the glass stage is engaged with the upper stage-guiding member 8 at the rear side of the lower stage. Thereby, the glass stage is to-and-fro and laterally reciprocally movable relative to the projector body 4 by the function of the lower stage and the upper stage-fitting member when in use. Assume that a film such as 35 mm wide strip slide film, an end scope film, a dental film, or the like is to be observed as it is or as inserted into a film jacket by using such a glass stage while being held between the upper and lower transparent plates. For instance, when a strip slide film of a 35 mm width as inserted into a film jacket is to be held between the upper and lower transparent plates, as shown in FIG. 11, the glass stage is shifted well forward relative to the projector body 4, and the transparent upper plate 13 are upwardly opened. Then, after the film jacket 20 containing the 35 mm wide strip slide films is inserted to a given position between the upper and lower transparent plates, the upper transparent plate 13 is completely closed and the lock lever 15 is engaged with the upper surface thereof.

When a desired image in the film held in the glass stage is to be projected, the image is moved to-and-fro and/or right and left relative to the projector body 4 to locate it just above the condenser lens 3.

However, the above-mentioned conventional glass stage has the following problem. That is, since the upper transparent plate 13 is rotatably supported by the rectangular frame body 11 at a given location, the former cannot make a motion other than the opening motion relative to the rectangular frame body 11 at all. Therefore, when a strip film is to be inserted between or detached from the upper and lower transparent plates of the glass stage as fitted to the overhead type projector, the upper transparent plate 13 needs to greatly be opened relative to the lower transparent plate 12. However, the reflecting mirror and the projecting lens system 18 exist above the glass stage. Therefore, as shown in FIG. 11, even when the lower stage 5 is moved to a stroke terminal position on the front side of the projecting body 4, the reflecting mirror 17 and the projecting lens system interrupt great opening of the upper transparent plate 13. Consequently, there is a problem in that it is very difficult to well appropriately locate the strip film on the lower transparent plate 12 at a desired position.

Further, the above-mentioned conventional glass stage is designed to mainly project 35 mm wide strip slide films, and thus the inner dimension of the rectangular frame body 11 is about 275 mm × 230 mm. Thus, in order to project a long strip film having a length greater than 275 mm, for instance, an end scope film or a microfilm of 16 mm in width and 300 to 400 mm in length or a Brownie film or a panaroma film of 60 mm in width and a length of 400 mm from end to end by using the above glass stage, it is necessary that the position of the long strip film is re-adjusted relative to the glass stage at least once during the projection so that a protruding portion of the long strip film from the glass stage may appropriately be held inside the glass stage. Thus, this glass stage poses a problem that the image-projecting operation is extremely troublesome.

SUMMARY OF THE INVENTION

It is therefore an object of the present invention to also advantageously solve the abovementioned problems possessed by the prior art, and to provide a strip film glass stage which allows sufficiently great opening of an upper transparent plate and easy and appropriate arrangement of the strip film irrespective of existence of a reflecting mirror and a projecting lens system.

It is another object of the present invention to advantageously solve the above-mentioned problems possessed by the prior art, and to provide a long strip film glass stage which allow easy projection of images of even a long film strip exceeding 275 mm in length from end to end without varying the positional relation of the film to the glass stage at all.

It is a still another object of the present invention to provide overhead projector systems to be used for projecting ordinary length or long strip films.

According to the first aspect of the present invention, there is a provision of a strip film glass stage to be used as an upper stage in an overhead type projector, which glass stage comprises a rectangular frame body having substantially the same dimension as that of a lower stage of the projector, a lower transparent plate fixed to the rectangular frame body for completely closing a center opening thereof, and an transparent upper plate which is adapted to push the strip film onto the lower transparent plate and which is rotatably supported by brackets through hinge pins at either one of end portions in a longitudinal or lateral direction of the upper transparent plate. The brackets are provided on the rectangular frame body, and the hinge pins project sidewisely from the upper transparent plate. Each of the brackets is provided with an elongated hole to which the corresponding hinge pin is fitted and which guides movement of the upper transparent plate in a pullout direction thereof. Each of the elongated hole is provided with a portion inclined downwardly to an end of a pushing terminal side of the upper transparent plate. The rectangular frame body is provided at one of side portions thereof with small holes into which upper stage-fitting pins are to snugly be fitted.

According to the second aspect of the present invention, there is a provision of a glass stage adapted to be used as an upper stage in an overhead type projector, which glass stage comprises a rectangular frame body having a lateral dimension, in its turn, a lateral dimension of an inner side of the frame body, greater than that of a projector body of the projector, a lower transparent plate fixed to the rectangular frame body, and an upper transparent plate freely openably hinged to the rectangular frame body for pushing the long strip film onto the lower transparent plate so that a long strip film can be placed on the lower transparent plate without projecting outwards therefrom. The rectangular frame body is provided with a pair of elongated holes laterally extending in a front side portion thereof so that the elongated holes may fit to upper stage-fitting pins projecting from an upper stage-fitting member. Each of the elongated holes has a length not smaller than that of a projecting width of the rectangular frame body from the projector body, more accurately, a projecting width of the inner peripheral edge of the frame body from the inner peripheral edge of the lower stage.

According to the third aspect of the present invention, there is a provision of an overhead type projector system comprising an overhead type projector and a glass stage as an upper stage. The overhead type projector comprises a substantially box-like projector body containing a light source unit, a frame-like lower stage supported on the projector body and adapted to reciprocally move to-and-fro thereon, an upper stage-fitting member supported on one side portion of the lower stage and adapted to reciprocally move right and left of the projector body, and a pair of upper stage-fitting pins projecting upwardly from the upper stage-fitting member. The glass stage has substantially the same constituent features as stated in the first or second aspect of the present invention.

According to the strip film glass stage of the first aspect of the present invention, since the upper stage-fitting pins are fitted into the small holes and preferably the rear side portion of the glass stage is further engaged with the upper stage-guiding member provided at the lower stage when the glass stage is attached to the overhead type projector, the strip film glass stage can reciprocally be moved to-and-fro and right-and-left relative to the projector body as desired under the action of the lower stage and the upper stage-fitting member. When the upper transparent plate of the glass stage as attached is to be opened, the whole glass stage is preferably sufficiently moved forward or right or left of the projector body in connection with the opening direction of the upper transparent plate, the upper transparent plate is then drawn out due to the function of the elongated holes, to which the hinge pins provided at the upper transparent plate are fitted, in the extending direction of the elongated holes, the upper transparent plate is completely passed under the reflecting mirror and the projecting lens system of the projector, and finally the upper transparent plate is opened. As a result, the upper transparent plate is opened to a large extent as desired without being hindered by them.

For this reason, according to the first aspect of the present invention, it is possible to extremely easily and accurately arrange the strip film onto the lower transparent plate at a desired location.

When the length of the elongated holes formed in the brackets is sufficiently great, it is possible that the upper transparent plate is drawn and opened, while the glass stage is located in the substantially central portion of the translucent plate. Even at that time, if the rear end of the upper transparent plate is completely passed under the reflecting mirror and the projecting lens, the upper transparent plate can greatly be opened.

After the strip film is appropriately arranged on the lower transparent plate while the upper transparent plate is being opened, the upper transparent plate is closed. Then, the glass stage is pushed relative to the elongated holes, and the hinge pins projecting from the upper transparent plate drop into the downwardly inclined portions provided at the pushing end sides of the elongated holes. Thereby, the strip film is well held between the upper and lower transparent plates.

Until the hinge pins enter the downwardly inclined portions of the elongated holes on holding of the strip film between the upper and lower transparent plates, a sufficient clearance exists therebetween. Thus, since it is not feared at all that the strip film undergoes a shearing force, in other words, a frictional force from the upper transparent plate depending upon a pushed location of the upper transparent plate, there is no possibility that the position of the strip film on the lower transparent plate changes or an emulsion-applied surface thereof is damaged by the above pushing operation of the upper transparent plate.

The above advantages can also be obtained when the upper transparent plate is drawn out. Since the upper transparent plate begins to leave from the lower transparent plate simultaneously when the hinge pins projecting from the upper transparent plates begin to come out from the downwardly inclined portions of the elongated holes, there is no possibility that the strip film on the lower transparent plate undergoes a frictional force from the upper transparent plate.

Therefore, according to the strip film glass stage in the first aspect of the present invention, when the hinge pins provided on the upper transparent plate are positioned in desired locations of the elongated holes having the rearwardly downwardly inclined portions, the upper transparent plate can greatly be opened without being interrupted by the reflecting mirror and the projecting lens system.

In the long strip film glass stage according to the second aspect of the present invention, since the upper stage-fitting pins are fitted into the elongated holes and preferably the rear side portion of the glass stage is further engaged with the upper stage-guiding member provided at the lower stage, the long strip film glass stage can be reciprocated to-and-fro and right-and-left with respect to the projector body under the action of the lower stage and the upper stage-fitting member. Further, even when the upper stage-fitting member reaches a movement limit location for the lower stage, the long strip film glass stage can be moved relative to the upper stage-fitting pins, in its turn, the upper stage-fitting member at least one of the right and left directions, by the action of the elongated holes formed in the glass stage, by a distance in conformity with the projecting amount of the glass stage from the projector body. Therefore, the long strip film can not only of course well be held between the upper and lower transparent plates over its entire length, but also any of the images of the long strip film can extremely easily be located immediately above the condenser lens, that is, can be projected, without changing relative position of the film to the glass stage.

Therefore, according to the long strip film glass stage of the second aspect of the present invention, all the images of the long strip film can simply and easily be projected by the action of the lower stage and the upper stage-fitting member, the action of the elongated holes of the glass stage, that is, the relatively sliding action between the glass stage and the upper stage-fitting member.

These and other objects, features, and advantages of the invention will be appreciated upon reading of the following description of the invention when taken in conjunction with the attached drawings, with the understanding that some modifications, changes and variations of the same could be made by the skilled person in the art to which the invention pertains without departing from the spirit of the invention or the scope of claims appended hereto.

BRIEF DESCRIPTION OF THE ATTACHED DRAWINGS

For a better understanding of the present invention, reference is made to the attached drawings, wherein:

FIGS. 8 and 9 are perspective views of other embodiments of the glass stages according to the second aspect of the present invention; and FIGS. 10 and 11 are perspective views illustrating a conventional example.

DETAILED DESCRIPTION OF THE INVENTION

Now, the present invention will be explained in more detail with reference to the attached drawings.

Figure 1:
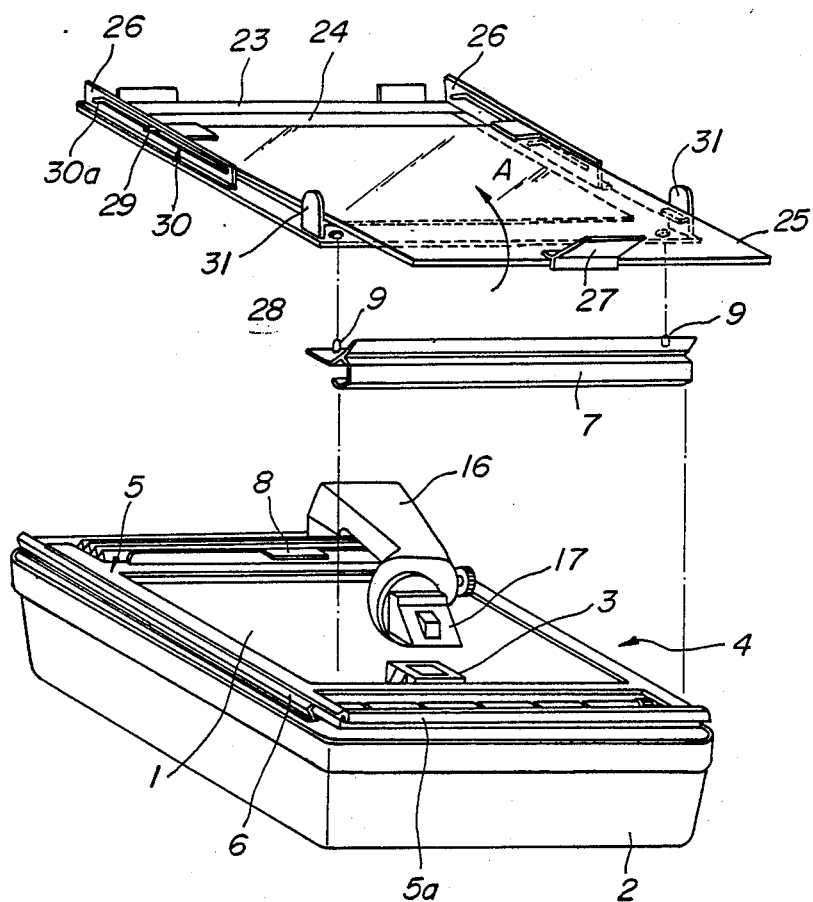
FIG. 1 is a perspective view of a glass stage together with an overhead type projector as an embodiment according to the first aspect of the present invention.

FIG. 1 is a perspective view of an embodiment of the glass stage according to the first aspect of the present invention together with an overhead type projector. In the illustrated embodiment, parts which are the same as or similar to those referred to in the aforementioned prior art are denoted by the same reference numerals.

That is, in FIG. 1, reference numerals 1, 2, 3, and 4 are a translucent plate, a box-like projector body having an upper opening covered with this translucent plate and containing a light source unit not shown, a condenser lens projecting upward from the translucent plate at the upper end portion thereof, and a projector body constituted by the parts 1, 2, and 3, respectively.

A reference numeral 5 denotes a lower stage exhibiting a substantially rectangular frame-like shape as a whole. The lower stage 5 has substantially the same lateral dimension as that of the translucent plate 1, and the longitudinally inner dimension of the former is slightly smaller than the longitudinal dimension of the latter.

Guide rails 6 are provided at laterally opposite sides of the projector body 4, and engage with the lower stage 5. The guide rails 6 guide reciprocal movement of the lower stage 5 in their extending direction, in other words, in the longitudinal direction of the projector body 4.

Figure 2:
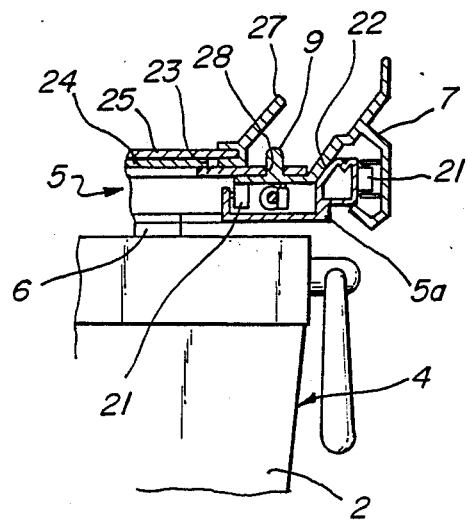
FIG. 2 is a structure for fitting an upper stage-fitting portion to a lower stage.

An upper stage-fitting member 7, which exhibits a substantially channel-like bar, is engaged with an engaging portion 5a provided at a front side portion of the lower stage 5 so that the upper stage-fitting member 7 may reciprocally move right and left relative to the projector body (see FIG. 2). As sectionally shown in FIG. 2, the upper stage-fitting member 7 is engaged with the engaging portion 5a by engaging the upper stage-fitting member 7 with a roller 21 and a guide rail 22 provided at the engaging portion 5a.

In FIG. 1, a reference numeral 8 denotes an upper stage-guiding member of a substantially hook-like side section provided at a rear side portion of the lower stage 5. This upper stage-guiding member is not necessarily indispensable for the projector. This guiding member 8 for the upper stage contacts a rear end surface and a rear upper surface of the below-mentioned long strip film glass stage, and functions to smoothly slide the glass stage together with the upper stage-fitting member 7 right and left relative to the lower stage 5.

Figure 3:
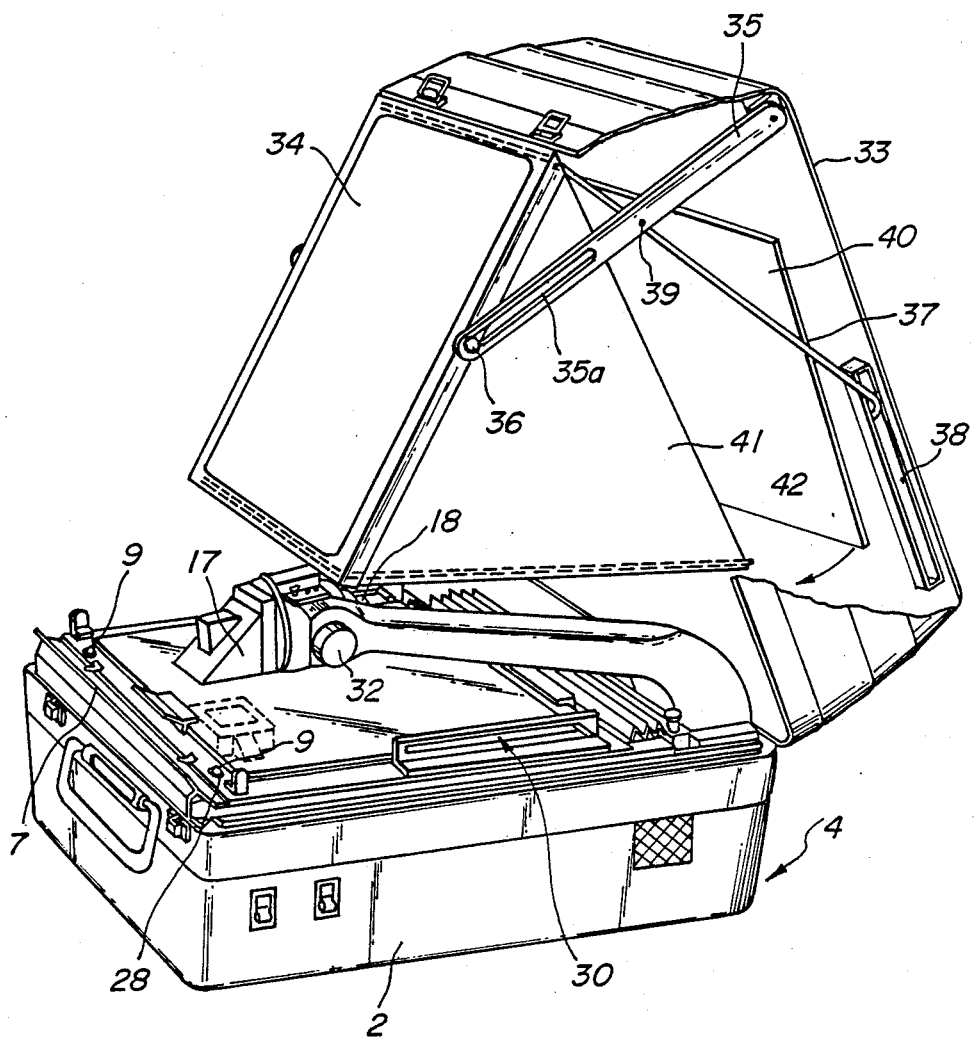
FIG. 3 is a perspective view illustrating an applied state of the glass stage onto an overhead type projector.

In FIGS. 1-3, reference numerals 9, 9 denote a pair of two upper stage-fitting pins which project upwardly from the upper stage-fitting member 7.

In the long strip film glass stage of this embodiment, the inner and outer dimensions of a rectangular frame body 23 are designed almost the same as those of a lower stage 5. A lower transparent plate 24 made of glass or plastic is fixed to the central portion of the rectangular frame body such that the transparent plate 24 is fixed to completely close a central portion of the rectangular frame body 23, and the upper transparent plate 25, which pushes the long strip film onto the lower transparent plate 24, is openably hinged to the rectangular frame body 23 through brackets 26 upwardly projecting from the frame body 23. By so constructing, the upper transparent plate 25 is freely opened from the lower transparent plate 24 by holding a knob 27 fixed at the front side portion of the upper transparent plate 25 and opening it from this side to that side.

In this glass stage, round holes 28 through which a pair of two upper stage-fitting pins 9 upwardly projecting from the upper stage-fitting member 7 are to be fitted, are formed in a front side portion of the rectangular frame body 23.

Thus, the strip film glass stage can be fitted to the overhead type projector as follows:

While the upper stage-fitting member 7 is engaged with the engaging portion 5a of the lower stage 5 (see FIG. 2), the upper stage-fitting pins 9 projecting from the upper stage-fitting member 7 are fitted into the respective round holes 28 formed in the glass stage, and the rear side portion of the glass stage is engaged with the upper stage-guiding member 8.

The glass stage thus fitted can be reciprocally moved to-and-fro relative to the projector body 4 up to the stroke ends of the lower stage 5 together with the upper stage-fitting member 7 under the action of the lower stage 5. Under the action of the upper stage-fitting member 7, the glass stage can reciprocally be moved up to stroke ends of the upper stage-fitting member 7 relative to the lower stage 5 in the lateral direction of the lower stage 5 and the projector body 4.

Therefore, according to the strip film glass stage, the strip film is held between the upper and lower transparent plates without projecting therefrom, and all the images of the film can simply and easily be located immediately above the condenser lens 3 by moving the glass stage as mentioned above.

In the illustrated strip film glass stage, the upper transparent plate 25 is rotatably supported by the brackets 26 by engaging hinge pins 29 projecting from the opposite right and left sides of the upper transparent plate 25 with the brackets 26 provided at the right and left side portions of the rectangular frame body 23. For this purpose, an elongated hole 30 longitudinally extends in each of the brackets 26, and slightly downwardly falls at its rear end portion. When the pins 29 fit in the elongated holes 30, the upper transparent plate 25 can freely be opened at any arbitrary position relative to the elongated hole 30. Thus, when the pins 29 fall in the downwardly inclined portions 30a at the rear end portions of the elongated holes 30, the upper and lower transparent plates are closely adhered to each other through the strip film to be projected. Further, after the upper transparent plate 25 is pulled out to desired horizontal positions of the elongated holes 30 as shown in FIG. 1, it is opened. During the opening operation, interference between the upper transparent plate 25 and the reflecting mirror 17 can well be prevented.

When the upper transparent plate 25 is to be drawn out like this, the pins 29 rise along the rearwardly downward inclined portions 30a, and the upper transparent plate 25 swiftly moves upwardly relative to the slide film on the lower transparent plate 24. Accordingly, it is not feared at all that the long slide film undergoes a shearing external force, that is, a frictional force from the upper transparent plate 25.

In the illustrated embodiment, in order to prevent contacting between the front side portion of the forwardly pulled upper transparent plate 25 and the lower transparent plate 24 and also prevent butting of the front side edge of the upper transparent plate 25 to the upper stage-fitting member 7, supporting brackets 31 are provided right and left at the front side portions of the rectangular frame member 23 to support the upper transparent plate 25 at a given height. The supporting brackets 31 function as means for guiding the pullout of the upper transparent plate 25.

FIG. 3 is a perspective view illustrating an applied state of the above-mentioned strip film glass stage to the overhead type projector with the screen. In FIG. 3, a reference numeral 32 denotes a focusing screw of the projecting lens system 18.

Reference numerals 33 and 34 denote a lid detachably attached to the rear end of the projector body 4, and a projecting screen attached to the lid 33, respectively.

While the lid 33 is being opened as shown in FIG. 3, the projecting screen 34 is attached to the lid 33 by fitting a pin 36 projecting sidewise from the screen 34 into a longitudinal hole 35a formed in a lower end of a supporting rod 35 pivotally supported at its upper at a corner of the upper end of the lid, fitting a lower end of a supporting rod 37 pivotally supported at the upper end of the projecting screen 34 into a guide channel 38 formed in a lower side portion of the lid 33, and rotatably supporting both the supporting rods 35 and 37 by a pin 39 at their intermediate positions.

The projecting screen 34 attached to the lid 33 is moved to a storing place very near a top wall of the lid 33 from a set location shown by upwardly moving the pins 36 along the longitudinal hole 35a and downwardly moving the lower end of the supporting rod 37 along the guide groove 38.

A reflecting mirror 40 is arranged inside the lid 33, and reflects an image coming from the projecting lens system 18 on the projecting screen 34. A light interrupting membrane 41 of a triangular side shape is attached to the projecting screen 34. The light interrupting membrane 41 is extended as shown in FIG. 3 by swingably downwardly turning a tip end of a swing arm 42 which is rotatably supported at the lower end of the projecting screen 34 and which is connected to the lower side of the light interrupting membrane 41. To the contrary, the light interrupting membrane can be folded by upwardly turning the tip end of the swing arm 42.

As mentioned above, the strip film glass stage is applied to the overhead type projector by fitting the round holes 28 formed in the front side portion of the glass stage to the upper stage-fitting pins 9 and engaging the rear side portion with the upper stage-guiding member 8.

Film images are projected by using the glass stage 5 thus applied as follows:

First, the strip film glass stage is preferably fully drawn out forwardly by the action of the lower stage 5, and the upper transparent plate 25 of the glass stage is upwardly spaced from the lower transparent plate 24 and drawn out forwardly by the action of the elongated holes 30 engaging with the pins 29. next, the upper transparent plate 25 is opened in an arrow A direction shown in FIG. 1 at a position where it does not interfere with the reflecting mirror 17. Then, a strip film not shown is placed on the lower transparent plate such that the longitudinal direction of the film may lie in the lateral direction of the lower transparent plate 24 alone or as inserted into a film jacket not shown such that opposite end portions of the film may not project from the lower transparent plate 24. Preferably, the lower transparent plate 24 has a sufficient lateral length, and the film is arranged in the central portion thereof. After that, the upper transparent plate 25 is closed such that the front side portion is supported by the supporting brackets 31. Subsequently, the upper transparent plate 25 is pushed rearwardly relative to the lower transparent plate 24, so that the pins 29 fall in the downwardly inclined portions 30a of the elongated holes 30 to hold the long strip film between the upper and lower transparent plates 24 and 25.

When the upper transparent plate 25 is to be drawn out after the holding of the strip film as mentioned above, the hinge pins 29 begin to upwardly move along the rearwardly downward inclined portions 30a and the upper and lower transparent plates 24 and 25 are simultaneously spaced from each other. Thus, the strip film will not undergo a frictional force from the upper transparent plate 25. This is similarly applicable to the case where the upper transparent plate 25 is pushed relative to the lower transparent plate 24. Since a clearance exists between the upper and lower transparent plates 24, 25 until the hinge pins 29 completely fall in the downwardly inclined portions 30a of the elongated holes 30, it is not feared that the position of the lower transparent plate is changed by the upper transparent plate 25 or that an emulsion-applied surface of the strip film is damaged.

Since the upper transparent plate 25 is greatly opened by the action of the elongated holes 30 without being influenced by the reflecting mirror, the strip film can extremely easily and assuredly be located on the lower transparent plate 24 at a desired place.

Thereafter, the strip film glass stage is moved to-and-fro and/or right and left relative to the projector body 4 by moving the lower stage relative to the projector body 4 and by moving the upper stage-fitting member 7 relative to the lower stage 5. Consequently, a desired image in the film strip is located immediately above the condenser lens 3. Thus, desired film images can be projected on the projecting screen 34 from the rear side through the reflecting mirror 17, the projecting lens system 18 and the reflecting mirror 40.

Figure 4:
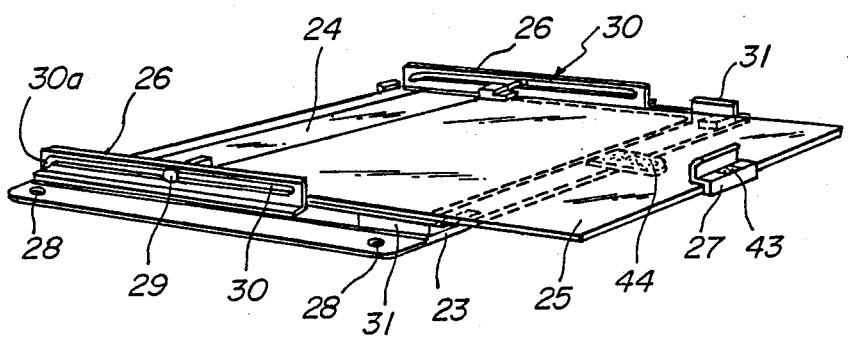
FIGS. 4 and 5 are perspective views of other embodiments of the glass stage according to the first aspect of the present invention.

FIG. 4 is a perspective view of an another embodiment of the glass stage according to the first aspect of the present invention. In this embodiment, the same round holes 28 as in the proceeding embodiment are formed in the front side portion of a rectangular frame body having substantially the same dimension as that of the lower stage 5, and brackets 26 having elongated holes 30 formed therein are fixed at front and rear left side portions of the rectangular frame body. A downwardly inclined portion 30a is provided in each of the elongated holes 30 at its left end portion.

In this embodiment, since the hinge pins 29 projecting from the upper transparent plate 25 are fitted into the elongated holes 30, the upper transparent plate 25 can be drawn out right with no fear that the upper transparent plate 25 interferes with the upper stage-fitting member 7. In addition, the upper transparent plate 25 can be opened or closed at any appropriate lateral location relative to the elongated holes without being interrupted by the reflecting mirror 17.

Reference numerals 43, 44 denote surface fastening members which are attached to a knob 27 and a rectangular frame member 23, respectively and which maintain the adhered state between the upper transparent plate 25 and the lower transparent plate 24.

Figure 5:
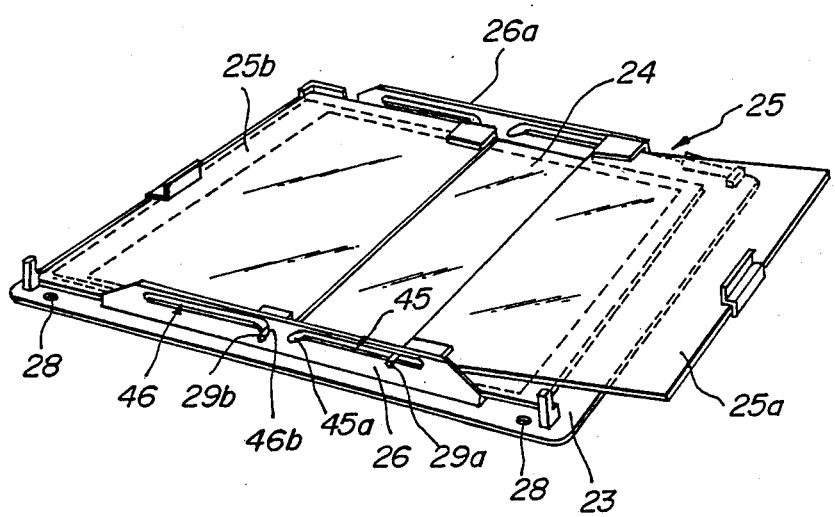

FIG. 5 is a perspective view of a further embodiment of the glass stage according to the first aspect of the present invention, in which an upper transparent plate 25 is divided into two right and left half sections 25a and 25b. Pins 29a and 29b are formed on left side portions of the right half section 25a and right side portions of the left half section 25b, and engaged with elongated holes 45 and 46 formed in the front and rear brackets 26a. Thereby, the right half section 25a and the left half section 25b can be drawn out rightward and leftward, respectively.

In the illustrated embodiment, downwardly inclined portions 45a and 46a are provided in the elongated holes 45, 46 at their approaching site. Thus, when the pins reach the push-in terminal ends of the downwardly inclined portions, the right and left half sections closely adhere to the lower transparent plate 24, and are also spaced from the lower transparent plate simultaneously with the pullout of the former.

As mentioned in the foregoing, according to the first aspect to the present invention, since the elongated holes, which guide movement of the hinge pins projecting from the upper transparent plate, are formed in the brackets for rotatably supporting the upper transparent plate, the upper transparent plate can be opened or closed at a desired opening degree without being interrupting by the reflecting mirror and the projecting mirror of the projector.

Further, since the downwardly inclined portions are provided in the elongated holes formed in the brackets at their push terminals, the upper and lower transparent plates are closely adhered to each other only when the hinge pins reach the push terminals. Thus, when the upper transparent plates are drawn out or pushed in, it is not feared that the arrangement of the strip film on the lower transparent plate is disturbed or that an emulsion-applied face is damaged.

Next, the second aspect of the present inventional will be explained below with reference to FIGS. 6-9.

Figure 6:
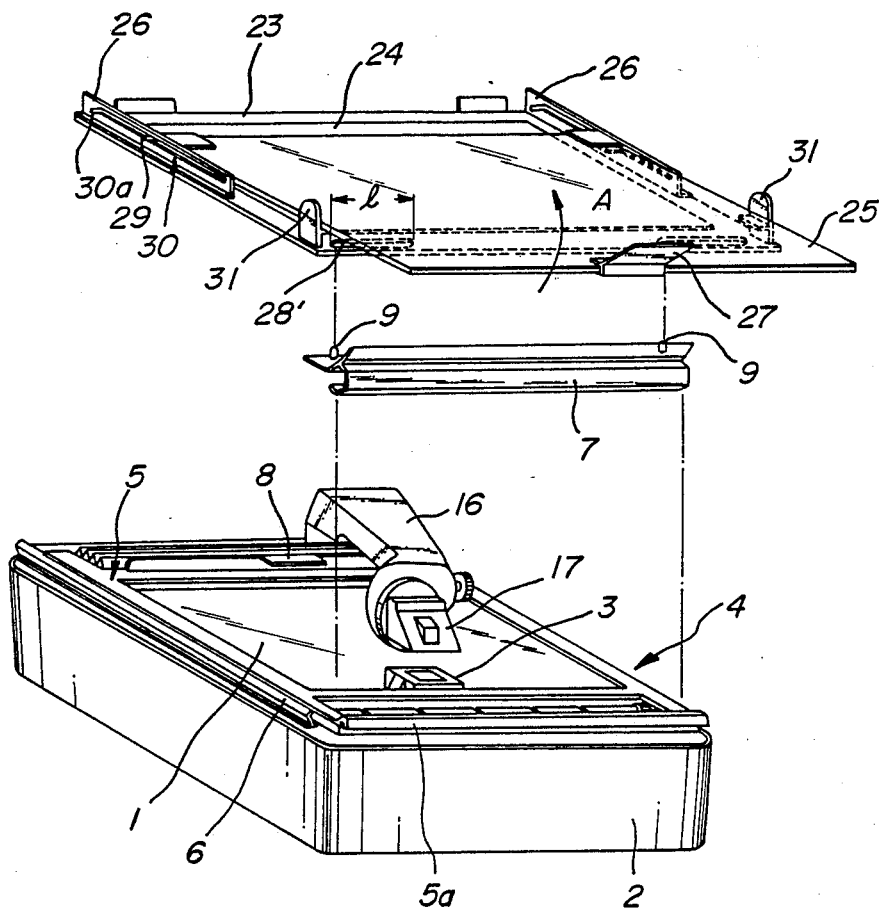
FIG. 6 is a perspective of a glass stage together with an overhead type projector as an embodiment according to the second aspect of the present invention.

FIG. 6 shows a perspective view of an embodiment of the glass stage according to the second aspect of the present invention together with an overhead type projector. Since the overhead type projector in FIG. 6 is the same as that shown in FIG. 1, explanation thereof is omitted. The same reference numerals in FIG. 6 denote the same or similar parts in FIG. 1. The upper stage-fitting member 7 is engaged with the lower stage 5 in the same manner as shown in FIG. 2.

In the long strip film glass stage of this embodiment, the lateral dimension of the rectangular frame body 23 is made greater than that of the projector body 4 so that the inner lateral dimension of the rectangular frame body 23 is made equal to or greater than the length of the long strip film which laterally protrudes from the projector body 4. In FIG. 6, the same parts as shown in FIG. 1 are denoted by the same reference numerals. That is, a lower transparent plate 24 made of glass or plastic is fixed to the central portion of the rectangular frame body such that the lower transparent plate 24 completely close a central portion of the rectangular frame body 23, and the upper transparent plate 25, which pushes the long strip film onto the lower transparent plate 24, is openably hinged to the rectangular frame body 23 through brackets 26 upwardly projecting from the frame body 23. By so constructing, the upper transparent plate 25 is freely opened from the lower transparent plate 24 by holding a knob 27 fixed at the front side portion of the upper transparent plate 25 and opening it from this side to that side.

In this glass stage, the front side portion of the rectangular frame body 23 is provided with elongated holes 28 which laterally extend and into which a pair of the two upper stage-fitting member pins 9 upwardly projecting from the upper stage-fitting member 7 are to be fitted. The length "l" of each of the elongated holes 28 is set to be in conformity with a projecting amount of the rectangular frame body 23 from the projector body 4, more accurately, the projecting amount of the inner edge of the rectangular frame body from that of the lower stage.

By so constructing, while the upper stage-fitting member 7 is engaged with the engaging portion 5a of the lower stage 5, the long strip film glass stage can be assembled to the overhead type projector by fitting the upper stage-fitting pins 9 projecting from the upper stage-fitting member 7 into the respective elongated holes 28 formed in the glass stage and engaging the rear side portion of the glass stage with the upper stage-guiding member 8. The glass stage thus assembled to the overhead type projector is allowed to reciprocally move to-and-fro with respect to the projector body 4 up to stroke ends of the lower stage 5 together with the upper stage-fitting member 7 under the action of the lower stage 5, while being allowed to reciprocally move to the stroke ends of the lower stage 5 right-and-left relative to the lower stage 5 and the projector body 4. In addition, the glass stage is allowed to relatively move by the length "l" of the elongated hole 28 in at least one of the right and left directions of the projector body 4 relative to the upper stage-fitting pins 9 and further the upper stage-fitting member 7 under the action of the elongated holes 28 formed in the upper stage.

Therefore, with respect to the long strip film held between the upper and lower transparent plates of the above-mentioned long strip film glass stage without projecting therefrom, all the images of the film can simply and easily be located immediately above the condenser lens 3 by the longitudinal and/or lateral movements of the glass stage as mentioned above without changing the positional relation between the long strip film and the glass stage.

In the illustrated long strip film glass stage, in order to hinge the upper transparent plate 25 to the brackets provided on the right and left sides of the rectangular frame body 23 by fitting the pins 29 projecting on the right and left sides of the upper transparent plate 25 therein, each of the brackets 26 is provided with an elongated hole 30 which longitudinally, horizontally extends and downwardly falls at its rear end portion. When the pins 29 are fitted into the elongated holes 30, the upper transparent plate 25 can be opened or closed at any arbitrary longitudinal position relative to the elongated holes 30. For this reason, when the pins 29 fall the downwardly inclined portions 30a of the elongated holes 30 at the rear side portion, the upper and lower transparent plates can closely be adhered to each other through the long strip film to be projected. As shown in FIG. 1, the upper transparent plate 25 is drawn out along the elongated holes 30 at a desired longitudinal position, and then is opened. Thus, interference between the upper transparent plate 25 and the reflecting mirror 17 can fully be prevented.

As the upper transparent plate 25 is drawn out like this, the pins 29 upwardly move in the rearwardly downwardly inclined portions 30a. Consequently, since the upper transparent plate 25 rapidly moves upwardly relative to the long slide film on the lower transparent plate, there is utterly no fear that the long slide film undergoes a shearing external force, in other words, a frictional force, from the upper transparent plate 25.

In order to prevent the front side portion of the forwardly drawn-out upper transparent plate 25 from the lower transparent plate 24 and also prevent the front edge of the former from butting the upper stage-fitting member 7 in this embodiment, support brackets 31 are provided right and left at the front side portions of the rectangular frame body 23 to support the upper transparent plate 25 at a desired level. These brackets 31 function as means for guiding the drawing-out of the upper transparent plate 25.

Figure 7:
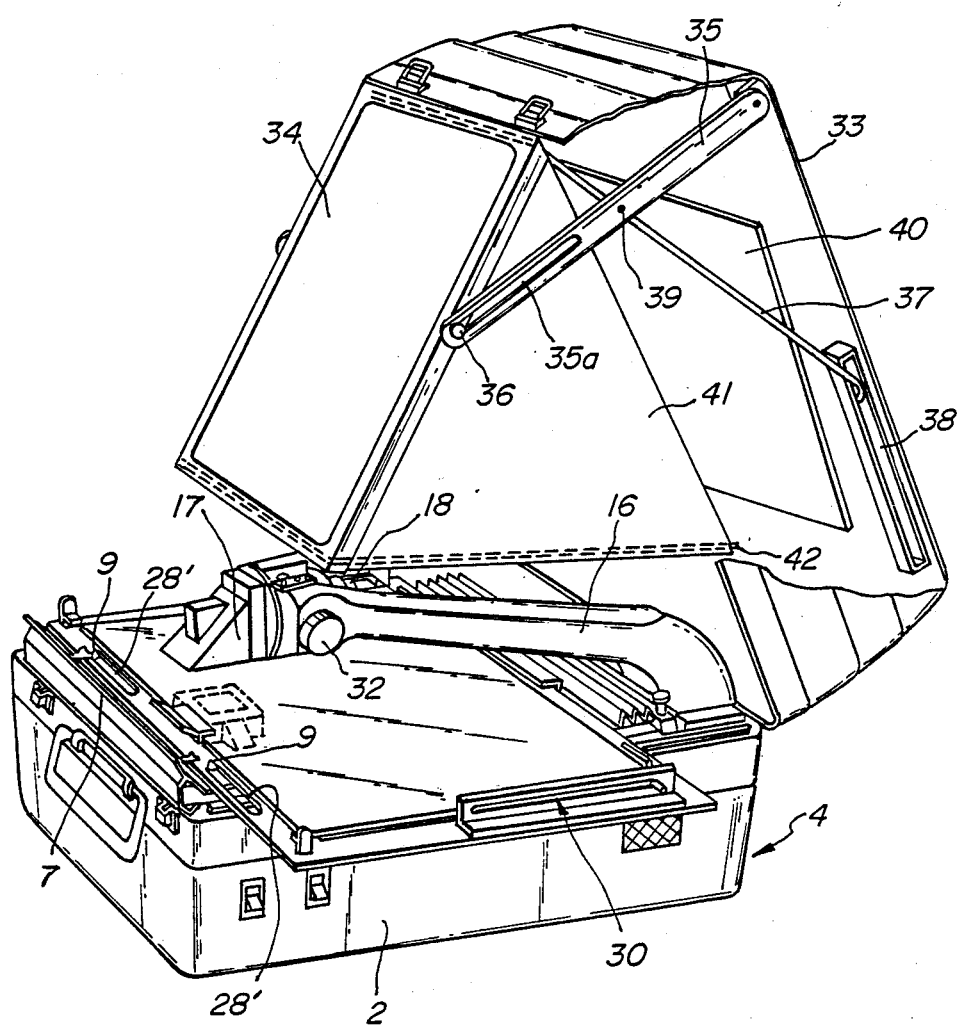
FIG. 7 is a perspective view of an applied state of the glass stage to the overhead type projector.
Figure 11:
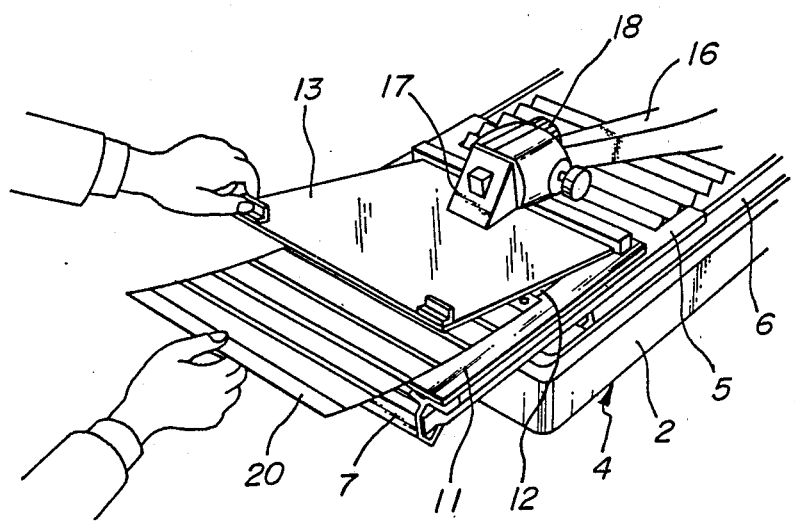

FIG. 7 is a perspective view of an applied state of the long strip film glass stage to the overhead type projector with a screen. In FIG. 7, a reference numeral 32 denotes a focusing screw of the projecting lens system 18.

Reference numerals 33 and 34 denote a lid detachably attached to the rear end of the projector body 4, and a projecting screen attached to the lid 33, respectively.

While the lid 33 is being opened as shown in FIG. 3, the projecting screen 34 is attached to the lid 33 by fitting a pin 36 projecting sidewise from the screen 34 into a longitudinal hole 35a formed in a lower end of a supporting rod 35 pivotally supported at its upper portion at a corner of the upper end of the lid, fitting a lower end of a supporting rod 37 pivotally supported at the upper end of the projecting screen 34 into a guide channel 38 formed in a lower side portion of the lid 33, and rotatably supporting both the supporting rods 35 and 37 by a pin 39 at their intermediate positions.

The projecting screen 34 attached to the lid 33 is moved to a storing place very near a top wall of the lid 33 from a set location shown by upwardly moving the pins 36 along the longitudinal hole 35a and downwardly moving the lower end of the supporting rod 37 along the guide groove 38.

A reflecting mirror 40 is arranged inside the lid 33, and reflects an image coming from the projecting lens system 18 on the projecting screen 34. A light interrupting membrane 41 of a triangular side shape is attached to the projecting screen 34. The light interrupting membrane 41 is extended as shown in FIG. 3 by swingably downwardly turning a tip end of a swing arm 42 which is rotatably supported at the lower end of the projecting screen 34 and which is connected to the lower side of the light interrupting membrane 41. To the contrary, the light interrupting membrane can be folded by upwardly turning the tip end of the swing arm 42.

As mentioned above, the long strip film glass stage is applied to the overhead type projector by fitting the elongated holes 28 formed in the front side portion of the glass stage to the upper stage-fitting pins 9 and engaging the rear side portion with the upper stage-guiding member 8.

Film images are projected by using the glass stage thus applied as follows:

First, the long strip film glass stage is preferably fully drawn out forwardly by the action of the lower stage 5, and the upper transparent plate 25 of the glass stage is upwardly spaced from the lower transparent plate 24 and drawn out forwardly by the action of the elongated holes 30 engaging with the pins 29. Next, the upper transparent plate 25 is opened in an arrow A direction shown in FIG. 6 at a position where it does not interfere with the reflecting mirror 17. Then, a long strip film not shown is placed on the lower transparent plate such that the longitudinal direction of the film may lie in the lateral direction of the lower transparent plate 24 alone or as inserted into a film jacket not shown such that opposite end portions of the film may not project from the lower transparent plate 24. Preferably, the lower transparent plate 24 has a sufficient lateral length, and the film is arranged in the central portion thereof. After that, the upper transparent plate 25 is closed such that the front side portion is supported by the supporting brackets 31. Subsequently, the upper transparent plate 25 is pushed rearwardly relative to the lower transparent plate 24, so that the pins 29 fall the downwardly inclined portions 30a, of the elongated holes 30 to hold the long strip film between the upper and lower transparent plates 24 and 25.

Next, the long strip film glass stage is displaced to-and-fro and/or right and left relative to the projector body 4 by moving the flower stage 5 relative to the projector body 4 and moving the upper stage-fitting member 7 relative to the lower stage 5, thereby locating a desired image of the long strip film immediately above the condenser lens 3. Thus, the film images are projected onto the projecting screen 34 from the rear side through the reflecting mirror 17, the projecting lens system 18, and the reflecting mirror 40.

Since the long strip film glass stage has a lateral dimension greater than that of the projector body, it has conventionally be impossible to locate film images at at least one side portion of the long strip film even when the lower stage 5 and the upper stage-fitting member 7 are moved to their respective stroke ends. However, in the present invention, when the film images located in such at least one side portion are to be projected, the glass stage is displaced in at least one of the right and left directions relative to the upper stage-fitting pins 9 and the upper stage-fitting member 7 by the action of the elongated holes 28 formed in the glass stage. Thereby, the desired image in such at least one side portion is located immediately above the condenser lens 3 without changing the relative position of the long strip film relative to the glass stage.

Therefore, even if a long strip film has a great lateral size, that is, the long strip film has a great length, all the images of the long trip film can extremely easily and simply be projected in an appropriate manner from end to end with the above-mentioned long strip film glass stage by the action of the elongated holes 28 of an appropriate length formed therein through moving the glass stage relative to the upper stage-fitting member 7.

FIG. 8 is a perspective view of another embodiment of the glass stage according to the second aspect of the present invention. In this embodiment, the lateral width of a rectangular frame body 23 is made greater than that of the projector body 4, and similar elongated holes 28 as in the previous embodiment are formed in the front side portion. Brackets 26 having elongated holes 30 formed therein are fixed to front and rear left sides of the frame body as shown. A downwardly inclined portion 30a is formed at a left end portion of each of the elongated holes 30.

According to this embodiment, as a matter of course, similar function and effects as mentioned in the above first embodiment can not only be obtained by the function of the elongated holes in the front side portion of the glass stage, but also the upper transparent plate 25 can be rightwardly drawn out in FIG. 4 without interfering with the upper stage-fitting member 7 under engagement of pins 29 projecting from the upper transparent plate 25 with the elongated holes 30. Thus, the upper transparent plate 25 can be opened or closed at any appropriate lateral location relative to the elongated holes 30 under correlation between the upper stage-fitting member 7 and the projector body 4 without being interrupted by the reflecting mirror 17.

In FIG. 8, face fastener members 43, 44 are attached to a knob 27 and the rectangular frame body 23, respectively, and maintain a closely adhered state between the upper and lower transparent plates 24, 25.

FIG. 9 is a perspective view of a further embodiment according to the first aspect of the present invention, in which a transparent plate 25 is divided to two right and left half sections 25a and 25b. Pins 29a and 29b are provided at left side portions of the right half section 25a and right side portions of the left half section 25b, respectively, and fitted into elongated holes 45, 46, respectively, formed in front and rear brackets 26a. Thereby, the right and left side sections 25a and 25b can be pulled out right and left, respectively.

Downwardly inclined portions 45a and 46a are provided in the elongated holes 45 and 46 at their approaching site, respectively. When the pins reach their push-in terminals, the right and left half sections 25a and 25b are closely adhered to the lower transparent plate 24.

In this long strip film glass stage, the same or similar function and effects as in the embodiment in FIG. 8 can be obtained when in use.

As mentioned above, according to the second aspect of the present invention, since the lateral dimension of, and that of the inner side of, the rectangular frame body is greater than the lateral size of the projector body, various long strip films can be held in the glass stage without projecting from the lower transparent plate. By utilizing the function of the elongated holes formed in the front side portions of the rectangular frame body in a length corresponding to the relation in the lateral width between the projector body and the rectangular frame body, all the images of the long strip film can extremely easily and simply be projected by displacing the glass stage in at least one of the right and left directions relative to the upper stage-fitting member, without changing the relative location of the film to the glass stage.

What is claimed is:

1. A glass stage adapted to be used as an upper stage in an overhead type projector, said projector comprising a substantially box-like projector body containing a light source unit, a frame-like lower stage supported on the projector body and adapted to reciprocally move longitudinally relative to the projector body, an upper stage-fitting member supported at one of side portions of the lower stage and adapted to reciprocally move laterally relative to the projector body, a pair of two upper stage-fitting pins upwardly projecting from the upper stage-fitting member, a supporting arm extending above the condenser lens from a corner of the projector body, and a reflecting mirror and a projecting lens system attached to the supporting arm, and said glass stage comprising a rectangular frame body having substantially the same dimension as that of the lower stage, a lower transparent plate fixed to the rectangular frame body, and an upper transparent plate adapted to push a strip film onto the lower transparent plate and rotatably supported by brackets provided on the rectangular frame body through hinge pins, said hinge pins projecting sidewisely from the upper plate, each of the brackets being provided with a longitudinal hole which engages with the hinge pin for guiding movement of the upper transparent plate in a drawing direction thereof, the longitudinal hole being provided with a portion inclined downwardly at an end of a push-in side of the upper transparent plate, and the rectangular frame body being provided at one of side portions thereof with small holes through which the upper stage-fitting pins are to snugly be fitted.

2. A glass stage according to claim 1, wherein said brackets are provided at front and rear side portions of the rectangular frame body.

3. A glass stage according to claim 1, wherein said brackets are provided at opposite right and left side portions.

4. A glass stage according to claim 2, wherein the upper transparent plate is divided into right and left half sections, and said hinge pins are sidewisely provided at left side portions of the right half section and right side portions of the left half section.

5. A glass stage according to claim 4, wherein elongated two holes to which said hinge pins of the right and left half sections are fitted are provided in each of the brackets, and downwardly inclined portions are formed at portions of the elongated holes at their adjacent site.

6. A glass stage according to claim 1, wherein supporting brackets to prevent the forward side portion of the upper transparent plate drawn out from contacting the lower transparent plate are provided on said rectangular frame body at forward positions of said brackets.

7. A glass stage adapted to be used as an upper stage in an overhead type projector, said projector comprising a substantially box-like projector body containing a light source unit, a frame-like lower stage supported on the projector body and adapted to reciprocally move longitudinally relative to the projector body, an upper stage-fitting member supported at one of side portions of the lower stage and adapted to reciprocally move laterally relative to the projector body, and a pair of two upper stage-fitting pins upwardly projecting from the upper stage-fitting member, said glass stage comprising a rectangular frame body having a lateral dimension greater than that of the projector body, a lower transparent plate fixed to the rectangular frame body, and an upper transparent plate freely openably hinged to the rectangular frame body and adapted to push a long strip film onto the lower transparent plate, the rectangular frame body being provided with a pair of elongated holes laterally extending at a front side portion thereof, the elongated holes being adapted to fit to the upper stage-fitting pins, and each of the elongated holes having a length not smaller than that of a projecting width of the rectangular frame body from the projector body.

8. A glass stage according to claim 7, wherein said upper transparent plate is rotatably supported by brackets provided on the rectangular frame body through hinge pins projecting sidewisely from the upper plate, each of the brackets being provided with a longitudinal hole which engages with the hinge pin for guiding movement of the upper transparent plate in a drawing direction thereof, and the longitudinal hole being provided with a portion inclined downwardly at an end of a push-in side of the upper transparent plate.

9. A glass stage according to claim 8, wherein said brackets are provided at front and rear side portions of the rectangular frame body.

10. A glass stage according to claim 8, wherein said brackets are provided at opposite right and left side portions.

11. A glass stage according to claim 9, wherein the upper transparent plate is divided into right and left half sections, and said hinge pins are sidewisely provided at left side portions of the right half section and right side portions of the left half section.

12. A glass stage according to claim 11, wherein elongated two holes to which said hinge pins of the right and left half sections are fitted are provided in each of the brackets, and downwardly inclined portions are formed at end portions of the elongated holes at their adjacent site.

13. A glass stage according to claim 7, wherein supporting brackets to prevent the forward side portion of the upper transparent plate drawn out from contacting the lower transparent plate are provided on said rectangular frame body at forward positions of said brackets.

14. An overhead type projector system comprising an overhead type projector and a glass stage as an upper stage, said projector comprising a substantially box-like projector body containing a light source unit, a frame-like lower stage supported on the projector body and adapted to reciprocally move longitudinally relative to the projector body, an upper stage-fitting member supported at one of side portions of the lower stage and adapted to reciprocally move laterally relative to the projector body, a pair of two upper stage-fitting pins upwardly projecting from the upper stage-fitting member, a supporting arm extending above the condenser lens from a corner of the projector body, and a reflecting mirror and a projecting lens system attached to the supporting arm, and said glass stage comprising a rectangular frame body having substantially the same dimension as that of the lower stage, a lower transparent plate fixed to the rectangular frame body, an upper transparent plate adapted to push a strip film onto the lower transparent plate and rotatably supported by brackets provided on the rectangular frame body through hinge pins, said hinge pins projecting sidewisely from the upper transparent plate, each of the brackets being provided with a longitudinal hole which engages with the hinge pin for guiding movement of the upper transparent plate in a drawing direction thereof, the longitudinal hole being provided with a portion inclined downwardly at an end of a push-in side of the upper transparent plate, and the rectangular frame body being provided at one of side portions thereof with small holes through which the upper stage-fitting pins are to snugly be fitted.

15. A glass stage adapted to be used as an upper stage in an overhead type projector, said projector comprising a substantially box-like projector body containing a light source unit, a frame-like lower stage supported on the projector body and adapted to reciprocally move longitudinally relative to the projector body, an upper stage-fitting member supported at one of side portions of the lower stage and adapted to reciprocally move laterally relative to the projector body, and a pair of two upper stage-fitting pins upwardly projecting from the upper stage-fitting member, and said glass stage comprising a rectangular frame body having a lateral dimension greater than that of the projector body, a lower transparent plate fixed to the rectangular frame body, and an upper transparent plate freely openably hinged to the rectangular frame body and adapted to push a long strip film onto the lower transparent plate, the rectangular frame body being provided with a pair of elongated holes laterally extending at a front side portion thereof, the elongated holes being adapted to fit to the upper stage-fitting pins, and each of the elongated holes having a length not smaller than that of a projecting width of the rectangular frame body from the projector body.

* * * * *